US008612985B2

(12) United States Patent
Schülke et al.

(10) Patent No.: US 8,612,985 B2
(45) Date of Patent: Dec. 17, 2013

(54) APPARATUSES AND METHODS FOR PROCESSING WORKITEMS IN TASKFLOWS

(75) Inventors: Andreas Schülke, Herzogenaurach (DE); Thomas Strauβ, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 167 days.

(21) Appl. No.: 13/170,379

(22) Filed: Jun. 28, 2011

(65) Prior Publication Data

US 2012/0131585 A1    May 24, 2012

Related U.S. Application Data

(60) Provisional application No. 61/416,793, filed on Nov. 24, 2010.

(51) Int. Cl.
    *G06F 9/54*    (2006.01)
(52) U.S. Cl.
    USPC .......................................................... 718/102
(58) Field of Classification Search
    USPC .......................................................... 718/106
    See application file for complete search history.

(56) References Cited

U.S. PATENT DOCUMENTS

| 7,028,303 | B2 * | 4/2006 | Lahey et al. | 718/106 |
|---|---|---|---|---|
| 8,222,994 | B1 * | 7/2012 | Sagar | 340/7.52 |
| 8,347,308 | B2 * | 1/2013 | Kawakami | 718/106 |
| 2002/0184293 | A1 * | 12/2002 | Cheeniyil et al. | 709/103 |
| 2003/0061266 | A1 * | 3/2003 | Ouchi | 709/106 |
| 2003/0078975 | A1 * | 4/2003 | Ouchi | 709/205 |
| 2003/0154115 | A1 * | 8/2003 | Lahey et al. | 705/8 |
| 2009/0129644 | A1 * | 5/2009 | Daw et al. | 382/128 |

* cited by examiner

*Primary Examiner* — Emerson Puente
*Assistant Examiner* — Charlie Sun
(74) *Attorney, Agent, or Firm* — Harness, Dickey & Pierce, P.L.C.

(57) ABSTRACT

At least one example embodiment discloses a method of processing a workitem including a plurality of tasks. The method includes transmitting requests for completion to the plurality of tasks, respectively, receiving processed data from a first task of the plurality of tasks in response to the request, the processed data being marked as intended for a second task of the plurality of tasks, changing a counter value associated with the second task, each of the plurality of tasks associated with a counter value, transmitting the processed data to the second task, and determining a state of the workitem based on the counter values.

24 Claims, 7 Drawing Sheets

| OpenSecureDataContexts and Pending Complete | TaskflowController | Task1 | Task2 | Task3 | TaskStates |
|---|---|---|---|---|---|
| 400 — Task1=0, Completing; Task2=0, Completing; Task3=0, Completing | CompleteRequest to all tasks | Receives CompleteRequest | Receives CompleteRequest | Receives CompleteRequest | Task1 = Active; Task2 = Active; Task3 = Active |
| 405 — Task1=0, Completing; Task2=0; Task3=0, Completing | | Pass out data for publishing and handover to Task2 and Task3 | Acknowledge Completed | Pass out data for publishing | Task1 = Active; Task2 = Completed; Task3 = Active |
| 410 — Task1=0; Task2=1; Task3=0 | Handover Task1 data to Task2 and set Task2 to Active | Acknowledge Completed | | Acknowledge Completed | Task1 = Completed; Task2 = Completed; Task3 = Completed |
| Task1=0; Task2=1; Task3=0 | | | Receives data from Task1 | | Task1 = Completed; Task2 = Active; Task3 = Completed |
| 415 — Task1=0; Task2=1; Task3=1 | Handover Task1 data to Task3 and set Task3 to Active | | | | |
| Task1=0; Task2=1; Task3=1 | | | | Receives data from Task1 | Task1 = Completed; Task2 = Active; Task3 = Active |
| 420 — Task1=0; Task2=0, Completing; Task3=1 | CompleteRequest to Task2 | | Receives CompleteRequest | | |
| | | | Pass out data for publishing and handover to Task3 | | |
| 425 — Task1=0; Task2=1, Completing; Task3=2 | Handover Task2 data to Task3 | | | | |
| Task1=0; Task2=0; Task3=2 | | | Acknowledge Completed | | Task1 = Completed; Task2 = Completed; Task3 = Active |
| 430 — Task1=0; Task2=0; Task3=1, Completing | CompleteRequest to Task3 | | | Receives CompleteRequest | |
| Task1=0; Task2=0; Task3=1 | | | | Acknowledge Completed | Task1 = Completed; Task2 = Completed; Task3 = Completed |
| 435 — Task1=0; Task2=0; Task3=1, Completing | CompleteRequest to Task3 | | | Receives data from Task2 | |
| Task1=0; Task2=0; Task3=0, Completing | | | | Receives CompleteRequest | |
| 440 — Task1=0; Task2=0; Task3=0 | Set WorkItem 1 to Completed | | | Acknowledge Completed | Task1 = Completed; Task2 = Completed; Task3 = Completed |

FIG. 4

APPARATUSES AND METHODS FOR PROCESSING WORKITEMS IN TASKFLOWS

PRIORITY

This application claims the benefit of priority under 35 U.S.C. §119 of U.S. Provisional Application No. 61/416,793, filed Nov. 24, 2010, the entire contents of which are hereby incorporated herein by reference.

BACKGROUND

1. Field

At least some example embodiments relate to processing workitems in taskflows.

2. Related Art

In some environments, individual software application elements are processed by a user in a defined sequence. The individual software-application building blocks (e.g., tasks) and sequence of tasks are configured and are called taskflows. The taskflows define both the position of the tasks and the data links between the tasks. The data links ensure that the output data of one task function is used as input data for a following task. Tasks can typically be executed sequentially, in parallel, or in an arbitrary sequence.

SUMMARY

At least one example embodiment discloses a method of processing a workitem including a plurality of tasks. The method includes transmitting requests for completion to the plurality of tasks, respectively, receiving processed data from a first task of the plurality of tasks in response to the request, the processed data being marked as intended for a second task of the plurality of tasks, changing a counter value associated with the second task, each of the plurality of tasks associated with a counter value, transmitting the processed data to the second task, and determining a state of the workitem based on the counter values.

At least another example embodiment discloses a computer readable medium including a data structure. The data structure includes a task flow, the task flow including a plurality of tasks, the data structure being configured to, when executed by a processor, cause the processor to transmit a request for completion to the plurality of tasks, receive processed data from a first task of the plurality of tasks in response to the request, the processed data being marked as intended for a second task of the plurality of tasks, change a counter value associated with the second task, each of the plurality of tasks associated with a counter value, transmit the processed data to the second task, and determine a state of the workitem based on the counter values.

At least one example embodiment discloses a method of processing a workitem including a plurality of tasks. The method includes, transmitting requests for completion to the plurality of tasks, respectively, receiving processed data from a first task of the plurality of tasks in response to the request, the processed data being marked as intended for a second task of the plurality of tasks, changing a counter value associated with the first task, each of the plurality of tasks associated with a counter value, transmitting the processed data to the second task, and determining a state of the workitem based on the counter values.

At least one example embodiment discloses a computer readable medium including a data structure. The data structure includes a task flow, the task flow including a plurality of tasks, the data structure being configured to, when executed by a processor, cause the processor to transmit requests for completion to the plurality of tasks, respectively, receive processed data from a first task of the plurality of tasks in response to a respective one of the requests, the processed data being marked as intended for a second task of the plurality of tasks, change a counter value associated with the first task, each of the plurality of tasks being associated with a respective counter value, transmit the processed data to the second task, and determine a state of the workitem based on the counter values.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments and wherein:

FIG. 4 illustrates an example sequence for a workitem at least one example embodiment.

Figure 1:
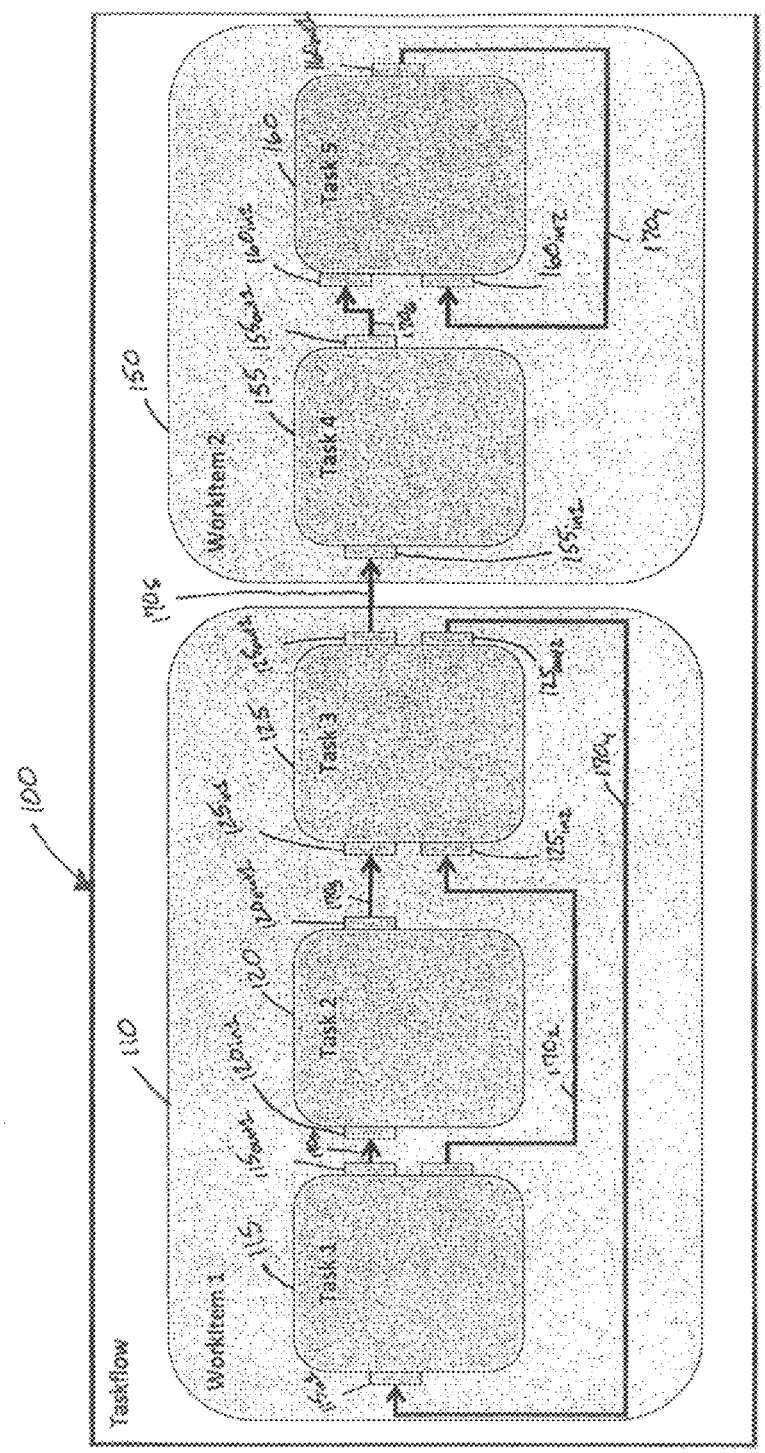
FIG. 1 illustrates a taskflow according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof When implemented in software, firmware, middleware or microcode, the program code or code segments to pedal in the necessary tasks will be stored in a machine or computer readable medium such as a storage medium. A processor(s) will perform in the necessary tasks.

Specific structural and functional details disclosed herein are merely representative for purposes of describing example embodiments. Example embodiments may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of storage medium or implemented over some type of transmission medium. The storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

In an environment where individual application elements (e.g., software applications) are processed (e.g., by a computer processor or user of the environment) in a defined sequence, individual application elements (e.g., building blocks) may be referred to as task(s).

For example, a task may include configuration files plus assemblies for a frontend (FE) and a backend (BE) part of an application. The task may further include resource assemblies for native language support and other values which tailor the behavior of the application. A task is a reusable item and can be used in different taskflows or also several times in one taskflow. For example, a task may be a viewing task which shows medical images in four segments on a screen or a backend task, having no user interface, which pre-processes medical images and provides data for a display.

A sequence of tasks may be referred to as a taskflow. The taskflow may define a relative position of the tasks as well as one or more data links between the tasks. The data links typically output data of one task and function as input data for a following or subsequent task. Tasks may be executed sequentially, in parallel, or in an arbitrary sequence.

Data links are data connections between tasks which are configured in a taskflow configuration file. The taskflow configuration file describes how tasks are connected with each other by data links.

FIG. 1 illustrates individual building blocks or tasks arranged as a taskflow according to example embodiments. As shown in FIG. 1, a task flow 100 includes two workitems 110 and 150.

A workitem is also configured in the taskflow. A workitem is a grouping of tasks which make sense from clinical point of view. For example, a taskflow may include two workitems. One of the workitems includes tasks which are executed from a medical technical assistant (MTA). The MTA checks images and may perform processing actions (e.g., subtracts images). The other workitem may be executed by a physician to generate a medical report, which is a base for further treatment of the patient.

A workitem has a state. A workitem may be pending, active and or completed. A user can claim a workitem. If the workitem is claimed, then the workitem is locked for the user, so that no other user (with a same role) can use the workitem at the same time. Certain output data of contained tasks may be sent to a hospital PACS (Picture Archiving and Communication System) system if the user completes a workitem. The workitem as a grouping mechanism can often be found in workflow frameworks.

The workitem 110 includes tasks 115, 120 and 125 and the workitem 150 includes tasks 155 and 160. The tasks 115, 120, 125, 155 and 160 may be at the lowest processing level of a hierarchical (e.g., multi-level) processing flow or tree. The tasks 115, 120, 125, 155 and 160 may be processed sequentially, in parallel or in any optional sequence, either automatically or with user interaction, wherein it is taken into consideration that the data links between tasks can also be cyclical.

In a medical environment, tasks 115, 120, 125 may be joined into the workitem 110 that performs a specific clinical function (e.g., determine a patient's heart rate) and the tasks 155 and 160 may be joined in a workitem 150 that performs another specific clinical function. The grouping of tasks may be referred to as a workitem. A taskflow may be configured from a combination of tasks and/or workitems.

Generally, a pre-processing background task resides as a first task, in front of the workitems and in the taskflow. The pre-processing task runs and prepares data if source images are available. The tasks in a workitem are then started if a user has claimed the workitem.

The work items 110 and 150 may be at a higher processing level than the tasks 115, 120, 125, 155 and 160.

Each task 115, 120, 125, 155 and 160 includes at least one input and at least one output. The task 115 includes an input $115_{in1}$ and outputs $115_{out1}$, $115_{out2}$. The task 120 includes an input $120_{in1}$ and an output $120_{out1}$. The task 125 includes inputs $125_{in1}$, $125_{in2}$ and outputs $125_{out1}$, $125_{out2}$. The task 155 includes an input $155_{in1}$ and an output $155_{out1}$. The task 160 includes inputs $160_{in1}$, $160_{in2}$ and an output $160_{out2}$.

Task inputs and outputs may be referred to as ports. Ports may perform the function of relaying data between the tasks 115, 120 125, 155 and 160 over data links $170_1$-$170_7$. The data links $170_1$-$170_7$ may be a communication channel between two tasks 115, 120 125, 155 and 160. Each of these functions (tasks, ports and links) together may operate as the taskflow 100. The taskflow 100 may have a configuration that references the individual task configurations and models a data flow via the data links $170_1$-$170_7$.

The tasks 115, 120 125, 155 and 160 may be reusable building blocks that may be used in different taskflow configurations. Different combinations of tasks 115, 120 125, 155 and 160 may produce different behaviors in the taskflow 100. It should be understood that each of tasks 115, 120 125, 155 and 160 may be used more than once in a taskflow.

In the taskflow 100 shown in FIG. 1, a taskflow controller (processor) processes all the tasks 115, 120 and 125 within the workitem 110 and finally, if the result is satisfactory for all the tasks 115, 120 and 125, the taskflow controller completes the workitem 110 (finalizing the workitem). The same process is done for the workitem 150. The finalizing may be initiated by a user requesting finalization through a user interface control. The taskflow controller may then finalize the workitem based on the user interface control.

As long as the user works with the tasks and does not complete the workitem 110 (finalize workitem), all data is considered temporary (similar to processing a file). For example, temporary data may be data that is not stored in a short tee in or long term storage. When finalizing the workitem 110, all data for the tasks are published. For example, the data may be written to a permanent data memory or transferred as valid data to external components (similar to storing a data file or sending off an online buy order).

In general, all tasks of a workitem typically generate data in some form. The generated data are taken up by other tasks, modeled by the data links, and are processed further.

The inventors have discovered that difficulties arise in determining when the workitem in fact is finalized, for example, so as to transition to a completed state.

All tasks receive a request for completion from a taskflow controller for the output of their data when a workitem is to be processed by the taskflow controller. All tasks receive the request for completion and output their data as well as report the finalizing.

However, in previous systems, data from a different task may arrive afterwards and must then be processed. For example, in FIG. 1, the task 125 may receive data from the task 115 and the task 120 in a first step. In the same way, the task 120 may receive data from the task 115. The task 120 in turn generates data and the task 125 again receives data from the task 120 in a second step. If the task 125 repeatedly outputs data, then the task 115 receives the data and starts again with the processing and generating of data.

Figure 2:
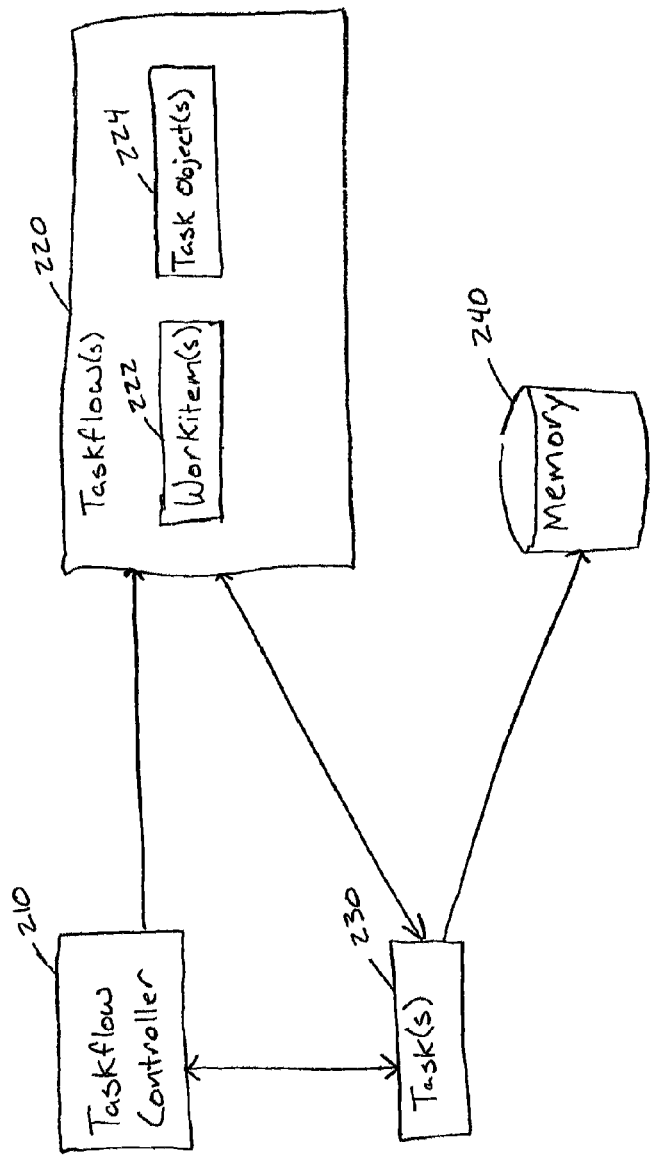
FIG. 2 illustrates a workflow management system according to at least one example embodiment.

FIG. 2 illustrates a workflow management system according to an example embodiment.

The workflow management system includes a taskflow controller 210, at least one taskflow 220, tasks 230 and a memory 240. The memory 240 may be a short term storage or an external storage. It should be understood that the workflow management system may include more than one taskflow 220.

The taskflow 220 may be the taskflow 100, shown in FIG. 1. Moreover, tasks 230 include tasks that are included in the taskflow 220. The tasks 230 may include the tasks 115, 120, 125, 155 and 160. The taskflow 220 includes workitems 222, such as the workitems 110 and 150, and task objects 224. The taskflow controller may be on a server machine. Tasks have their own lifecycle and may be on a machine separate from the server machine or on the server machine. The taskflow controller has, internally, a software representation of the task running outside in a different process. This is the task object. The task object contains the actual state (e.g. whether the task in running or not) and also has a communication channel to the remote task which is used to, e.g., send a command to complete or shut down.

The taskflow controller 210 is configured to monitor a state of the workitem 222 and the task object 224. Each task 230 is associated with a task object 224. The task object 224 may be in an active state or a completed state upon receiving a request for completion from the taskflow controller 210. The workitem 222 may also be in an active or completed state.

The taskflow controller 210 sends a request for completion to each task 230 of the workitem 222 and monitors the state of the associated task object 224. When the associated task object 224 is active, the taskflow controller 210 takes note of the fact that a complete acknowledge response from the task 230 is still outstanding. As long as at least one complete acknowledge response is still outstanding from one of the tasks 230, the workitem 222 does not transition to a completed state.

For each request to complete that a task 230 receives from the taskflow controller 210, the task 230 returns at least one complete acknowledge response to the taskflow controller 210 when the task 230 is completed. When the taskflow controller 210 receives the complete acknowledge response, the taskflow controller 210 resets the associated task object 224 to complete and, thus, determines that the task 230 is completed.

A task 230 outputs data within a time interval after the complete request is received from the taskflow controller 210, but before sending a complete acknowledge response to the taskflow controller 210.

The data output by the task 230 are marked (in the following called secure data context). In other words, a data structure output by the task 230 includes a unique number variable. If the unique number variable in the software (SW) is null, then there is no secure data context. If the unique number variable is set to a value, then the taskflow controller 210 treats the data as having a secure data context. If the taskflow controller 210 detects that data with a secure data context are transferred, the taskflow controller 210 increases a counter (henceforth called open secure data contexts) for the task 230. The taskflow controller 210 can detect that data with a secure data context are transferred because every hand over between tasks goes through the taskflow controller 210. Consequently, the taskflow controller 210 may stop transferring data in critical phases to clear processing resources for important tasks.

If a second task receives the data with secure data context, the corresponding open secure data context of the task 230 that outputted the data may be reduced by one. The taskflow controller 210 then sends a renewed complete request to the second task upon reducing the counter by one, meaning that an acknowledgment of completion is again pending.

As will be described below with reference to FIGS. 3-4, open secure data contexts may be increased for the task outputting the data to the second task and/or for the second task. If the open secure data context is increased for the task outputting the data, the open secure data context may be reduced by one when the data is output from the taskflow controller to the second task or when a renewed complete request is sent to the second task. If the open secure data context is increased for the second task, the open secure data context may be reduced by one when the taskflow controller transmits a renewed complete request to the second task.

As long as at least one open secure data context is higher than zero, the workitem 222 does not transition to the completed state. The workitem 222 transitions to the completed state when all tasks have sent completed acknowledge responses to the taskflow controller 210 and all open secure data contexts are at zero.

As a result, the transition of the workitem 222 into the completed state is delayed until all tasks have returned a completed response and all data (even the data derived from other tasks) have been processed and/or generated.

Once the workitem 222 transitions to the completed state, the workitem 222 outputs the generated data to the memory 240 through the task 230, where the generated data may be published. It should be understood that the taskflow controller 210 may output the generated data to the memory 240 instead of the workitem 222.

Writing to memory is only one possibility of outputting the generated data. Writing to memory may be considered a type of "publishing". While a workitem is active, all generated data are handled inside the tasks of the workitem and are not visible outside of it. The data are published when a workitem reaches a completed state. Once the data is published, the data are visible outside the workitem (and typically then they are persisted so that a user can open the workitem again and see the data again). By using a counter for the open secure data context, it is also possible to control cyclical sequences with a repeated data throughput between the same tasks.

Once the workitem 222 makes the transition to the completed state, either the taskflow controller 210 or any other observer can store or transfer all data that are present. In at least one example embodiment, publishing the data may be a task in the work item.

Figure 3:
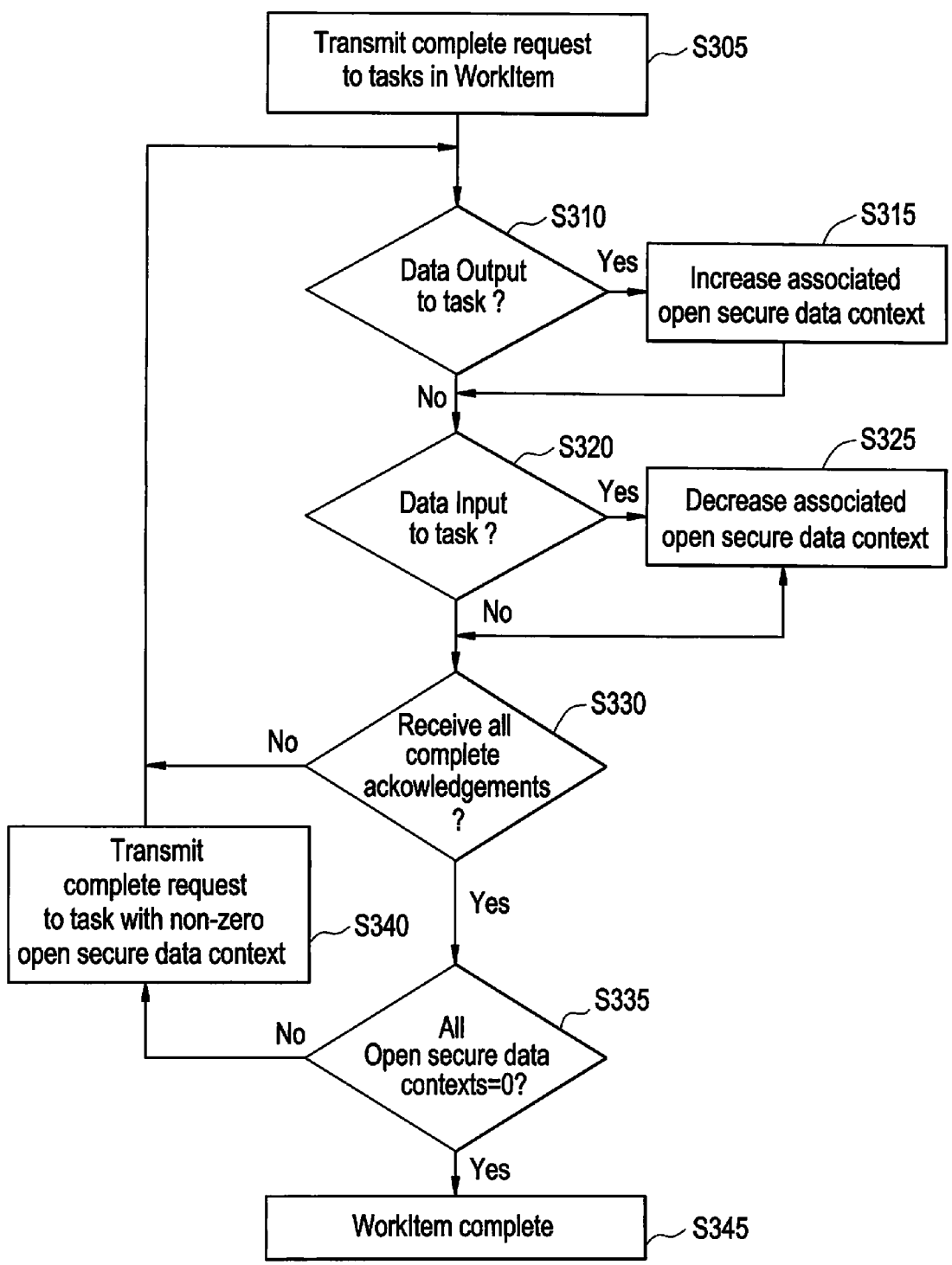
FIG. 3 a method of processing a workitem including a plurality of tasks according to at least one example embodiment.

FIG. 3 illustrates a method of processing a workitem including a plurality of tasks according to an example embodiment. It should be understood that the method shown in FIG. 3 may be implemented by the system shown in FIG. 2. In FIG. 3, the method includes, transmitting requests for completion to the plurality of tasks, respectively, receiving processed data from a first task of the plurality of tasks in response to the request, the processed data being marked as intended for a second task of the plurality of tasks, changing a counter value associated with the first task, each of the plurality of tasks associated with a counter value, transmitting the processed data to the second task, and determining a state of the workitem based on the counter values.

As shown in FIG. 3, a taskflow controller (e.g., 210) transmits complete requests to all tasks in a workitem at S305. It should be understood that open secure data contexts associated with the tasks are initialized to zero. At S310, the taskflow controller monitors the tasks and determines whether a task outputs data for another task. If data is not output from a task to another task, the method proceeds to S320.

If data is output from a task for another task, the taskflow controller increases an associated open secure data context for the outputting task at S315. Then, at S320, the taskflow controller determines whether any data output from a task is input into another task. If data is input, the taskflow controller decreases the associated open secure data context for the outputting task, at S325.

After decreasing the associated open secure data context or, if no data is input to a task, the taskflow controller determines whether all complete acknowledgments have been received at S330. If all complete acknowledgements have not been received by the taskflow controller, the method returns to S310.

If all complete acknowledgements have been received by the taskflow controller, the taskflow controller determines whether all open secure data contexts are equal to zero, at S335.

If there is an open secure data context that does not equal zero, the taskflow controller transmits a complete request to the associated task at S340. The method then returns to S310.

If all open secure data contexts are equal to zero, then the taskflow controller determines that the workitem is complete at S345.

FIG. 4 illustrates an example sequence for the workitem 110, shown in FIG. 1. In FIG. 4, the method includes, transmitting requests for completion to the plurality of tasks, respectively, receiving processed data from a first task of the plurality of tasks in response to the request, the processed data being marked as intended for a second task of the plurality of tasks, changing a counter value associated with the second task, each of the plurality of tasks associated with a counter value, transmitting the processed data to the second task, and determining a state of the workitem based on the counter values.

In FIG. 4, at S400, tasks Task1, Task2 and Task3 receive complete requests from a taskflow controller. At S405, the task Task1 passes out data to be handed over to the tasks Task2 and Task3. The passed out data are already available now and would not be a problem for completing the workitem. Therefore, the task Task1 is not marked. But, the data is forwarded from the task Task1 to the task Task2 which processes the new data. At S405, the task Task2 acknowledges completion.

Therefore, at S410, the taskflow controller receives the data from the task Task1 and transmits the data over to Task2. The data forwarded to the task Task2 is recorded on a Task2 object (task state) to indicate that there is data handed over which should be processed before the workitem can be complete. The data output from the task Task1 includes a small label to indicate the data is output from the task Task1 while the task Task1 is completing. The taskflow controller marks the task Task2 with one secure data context.

At S415, the taskflow controller forwards the data from the task Task1 to the task Task3 marks the task Task3 with one secure data context. Since the task Task2 acknowledges completion at S405, the taskflow controller transmits another complete request to the task Task2 at S420 and reduces by one the open secure data context associated with the task Task2. The task Task2 processes the data and passes out data for publishing and handover to the task Task3.

At S425, the taskflow controller receives the data from the task Task2 and hands over the data to the task Task3. The taskflow controller marks the task Task2 with another open secure data context. The task Task2 acknowledges completion after publishing the data and transmitting the data to the taskflow controller for a handover. The taskflow controller then reduces the associated open secure data context by one when the data is passed to the task Task3

Thus, at S400-S425, the three tasks Task1, Task2 and Task3 became a complete request. Due to this, the task Task1 passes data out (S405) to tasks Task2 and Task3 (S410-S420a) which have to be processed before the workitem finally goes to a completed state. As a consequence of the data from the task Task1, the task Task2 produces derived data (S420) which are handed over to the task Task3 (S425).

At S430, the taskflow controller knows it handed over the secured data from Task2 to Task3. At S425, the open secure data context of the task Task3 is 2. Because the task Task3 was set Active again, the taskflow controller sends again a request for completion to request the task Task3 to send a complete acknowledgment if the task Task3 has finished all data processing. If the taskflow controller sends the request for completion automatically the taskflow controller recognizes the task Task3 as "completing". Because the request for completion is sent from the taskflow controller, the taskflow controller can reduce the count of the open secure context of the task Task3 by one. At S430, the task Task3 sends a complete acknowledgement, which resets the "Completing" flag in taskflow controller.

At S435, the taskflow controller detects that there is still one open secure data context and, therefore, sends another request for completion to Task3. Again, the task Task3 now receives data from the task Task2 and processes the received data. At S435, the task Task3 also receives the request for completion. At S435, the taskflow controller has sent all requests for completion and only one of the requests for completion is not yet acknowledged. As soon as the task Task3 acknowledges completion, the completing state is reset and all pre-conditions are fulfilled for the taskflow controller to set the workitem to Completed at S440.

With reference to FIG. 3, open secure data contexts are decreased by the taskflow controller when the data is handed-over. In FIG. 4, open secure data contexts may be decreased by the taskflow controller when the taskflow controller transmits another complete request and/or when the data is handed-over.

It should be understood that the handover of data is processed in the execution context of the task (the taskflow controller is triggering it but the hand over happens in the task). To avoid race conditions the complete request is also directly sent in the task. Therefore, the reducing of the open secure data context count may be at the end of hand over data or the beginning of the complete request. Consequently, the reduction of the open secure data context may be considered at one time stamp and not two different time stamps.

Figure 5:
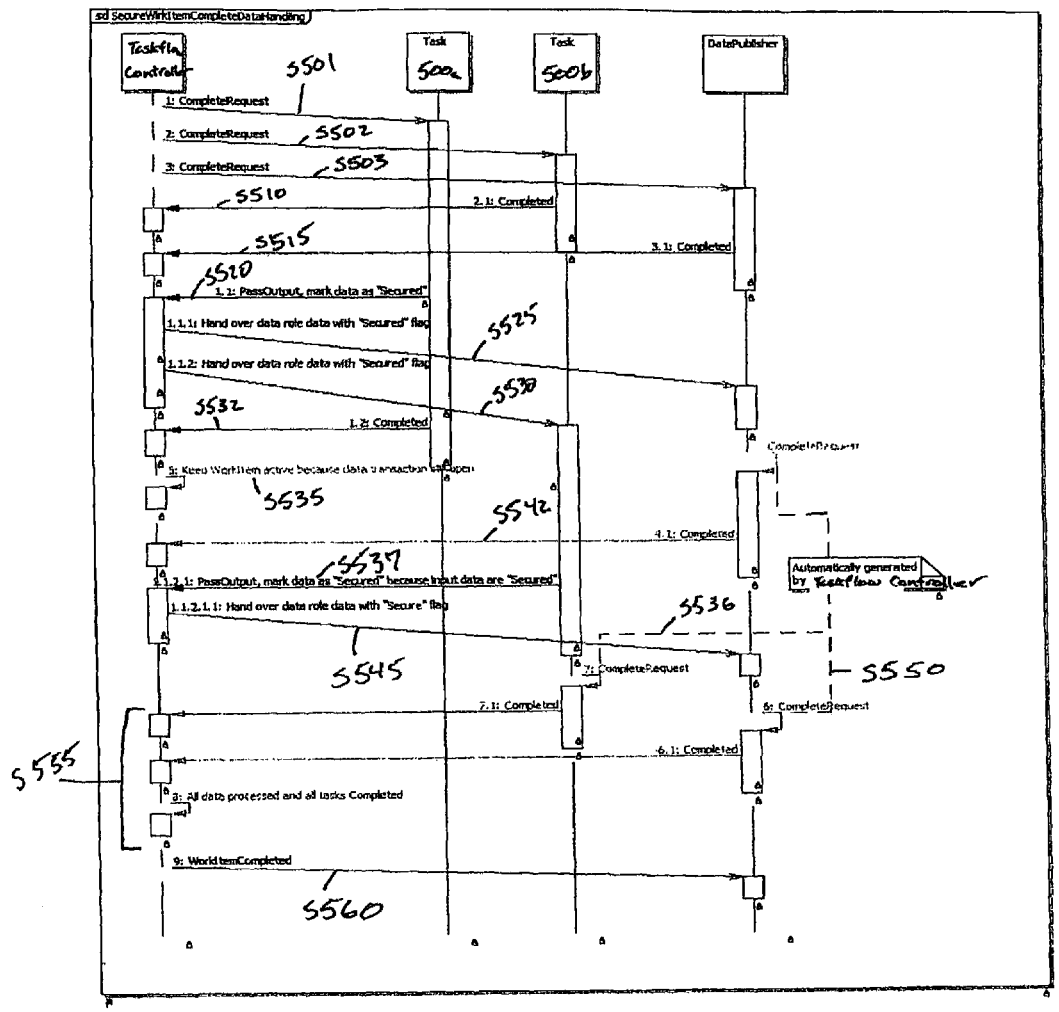
FIG. 5 illustrates a method of processing a workitem including a plurality of tasks according to at least one example embodiment.

FIG. 5 illustrates a method of processing a workitem including a plurality of tasks according to an example embodiment. As shown, a taskflow controller transmits complete requests to tasks 500a, 500b and a data publisher at S501-S503. Generally, tasks in a workitem have one data link to an input port of the DataPublisher (DP). From a taskflow controller point of view, the DP is not a special task. The DP is acting as an observer (see above) and is making the data visible outside the workitem.

At S510 and S515, the task 500b and the data publisher transmits complete acknowledgment to the taskflow controller. At S520, the task 500a performs the task and passes its output to the taskflow controller. The task 500a marks the data as secure when it passes out the data while it has a complete request pending. The taskflow controller hands the output with a secure flag over to the task 500b and the data publisher at S525 and S530, respectively.

At S532, the task 500a transmits a complete acknowledgment to the taskflow controller after output the data to the taskflow controller. It should be understood that S532 may be performed before or at the same time as S525 and S530.

At S535, the taskflow controller recalculates the workitem state. The taskflow controller may recalculate the workitem state every time any states of the tasks or open secure data contexts or states like "Completing" change. Even if the result will not change, the processing of the recalculation happens. This also happens if task 500a sends Completed (S532). At S535, the recalculation happens but results in a state that the workitem cannot be set to Complete because some open secure data contexts transactions are still open.

As shown at S536, the taskflow controller transmits a complete request to the task 500b since the taskflow controller handed over secured data to the task 500b at S530.

At S537, the task 500b processes the data received at S530, marks the data as secure, and transmits the processed data to the taskflow controller for the taskflow controller to transmit the processed data to the data publisher.

At S542, the data publisher publishes the data received at S525 and acknowledges completion.

At S545, the taskflow controller transmits the data received from the task 500b to the data publisher. Since the data is marked as secure, the taskflow controller transmits a complete request to the data publisher at S550. It should be understood that S545 and S550 may be conducted at the same time.

At S555, the task 500b and the data publisher acknowledge completion. Since there are no outstanding complete requests, the taskflow controller completes the workitem at S560.

At least one example embodiment may include a medical work flow management system. The medical work flow management system includes a processor and a memory on which a data structure is stored. The data structure includes a task flow, the task flow including a plurality of tasks ordered hierarchically. More specifically, the data structure includes a task flow, the task flow including a plurality of tasks, the data structure being configured to, when executed by a processor, cause the processor to transmit a request for completion to the plurality of tasks, receive processed data from a first task of the plurality of tasks in response to the request, the processed data being marked as intended for a second task of the plurality of tasks, change a counter value associated with the second task, each of the plurality of tasks associated with a counter value, transmit the processed data to the second task, and determine a state of the workitem based on the counter values.

Figure 6:
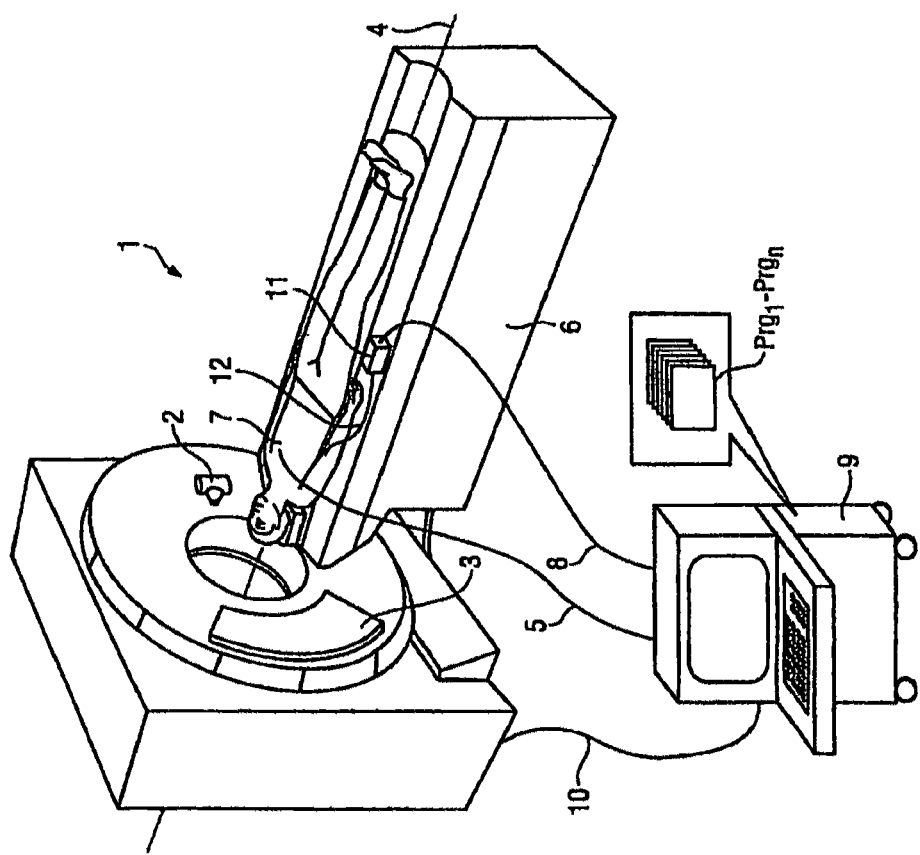
FIG. 6 illustrates a system for computed tomography according to at least one example embodiment.

FIG. 6 illustrates a system for computed tomography according to example embodiments, the system for computed tomography 1 may be a medical work flow management system. As shown in FIG. 6, the system for computed tomography 1 may include an X-ray tube 2, a detector 3, a system axis 4, an ECG lead 5, a displaceable patient couch 6, a patient 7, a control line for the injector 8, a control and arithmetic logic unit 9, a control and data line to the CT 10, an injector 11 an a contrast medium line 12.

As is illustrated by FIG. 6, the computed tomography system 1 may include the control and arithmetic logic unit 9 including data memories with programs $Prg_1$-$Prg_n$. As one skilled in the art will appreciate, individual method steps and control tasks may be distributed among different computers within the scope of the example embodiments. The control and arithmetic logic unit 9 shown here is connected via a control and data line 10 to the actual CT, which has an X-ray tube 2 and, oppositely thereto, a detector that is fastened on a gantry and can move on a circular track in order to scan the patient.

During a scanning operation, a patient 7 who is located on a couch 6 that can be displaced in the direction of the system axis 4, is displaced in the direction of the system axis 4 such that, in the final analysis, spiral scanning takes place relative to the patient's coordinate system. The computed tomography system 1 additionally has an ECG that is integrated in the arithmetic logic unit 9 and scans the heart rate of the patient 7 via the ECG line 5. Furthermore, the control and arithmetic logic unit 9 uses the control line 8 to operate an injector 11 with the aid of an integrated contrast medium pump, and via the hose line 12 depicted this injector 11 injects the required contrast medium into the patient's 7 blood circulation at a prescribed flow rate.

According to at least one example embodiment, the programs $Prg_1$ to $Prg_n$ stored in the arithmetic logic and control unit firstly push the patient 7 so far into the beam path of the CT that a so-called prescan of a cardiac artery can be carried out. There is no feeding of the patient 7 in the case of this prescan; rather, a tomogram of the heart is produced only in a plane of low dose rate in order to establish the contrast medium filling of an artery essential to the examination.

If the patient 7 is located in the correct prescan position, the injector 11 injects contrast medium at a prescribed flow rate, and either the operator uses the reconstructed tomogram output on a illustration screen to establish when there is a sufficient contrast medium filling in the observed cardiac artery, or an appropriate program can establish via automatic image processing whether sufficient contrast is present in the reconstructed image for a good illustration of the arteries.

As one skilled in the art will appreciate, each of the components of the computed tomography system 1 may be designed by separate entities (e.g., different work centers within a corporation or separate corporations). Therefore, control and operation of each component may have separately designed tasks, workflows, clinical tasks and/or taskflows.

For example, X-ray tube 2 and detector 3 may have an associated operational task. A manufacturer may assemble a system including the X-ray tube 2 and detector 3. The manufacturer may design a task to operate the system including the X-ray tube 2 and detector 3.

For example, the manufacturer may design a task such that the properties of the task may be published to a higher level (e.g., another manufacturer who combines the displaceable patient couch 6 with the system including the X-ray tube 2 and detector 3). Another manufacture may design a workitem associated with moving the displaceable patient couch 6 through the system including the X-ray tube 2 and detector 3. The taskflow designer may put an entire computed tomography system 1 together further including the arithmetic logic unit 9 and the injector 11.

Although the above example was described with regard to a computed tomography system, example embodiments are not limited thereto. For example, the system may be another imaging system (e.g., MRI). Further, example embodiments are not limited to imaging systems. For example, example embodiments may be related to a clinical study system or other health care management system. Further, as one skilled in the art will appreciate, example embodiments may be related to any system using tasks and/or workflows and/or taskflows.

The system using tasks may be embodied as a computer readable medium in the control and arithmetic logic unit 9. The computer readable medium includes a data structure. The data structure includes a task flow, the task flow including a plurality of tasks.

More specifically, the data structure includes a task flow, the task flow including a plurality of tasks, the data structure being configured to, when executed by a processor, cause the processor to transmit a request for completion to the plurality of tasks, receive processed data from a first task of the plurality of tasks in response to the request, the processed data being marked as intended for a second task of the plurality of tasks, change a counter value associated with the second task, each of the plurality of tasks associated with a counter value, transmit the processed data to the second task, and determine a state of the workitem based on the counter values.

Alternatively, the data structure includes a task flow, the task flow including a plurality of tasks, the data structure being configured to, when executed by a processor, cause the processor to transmit requests for completion to the plurality of tasks, respectively, receive processed data from a first task of the plurality of tasks in response to a respective one of the requests, the processed data being marked as intended for a second task of the plurality of tasks, change a counter value associated with the first task, each of the plurality of tasks being associated with a respective counter value, transmit the processed data to the second task, and determine a state of the workitem based on the counter values.

Figure 7:
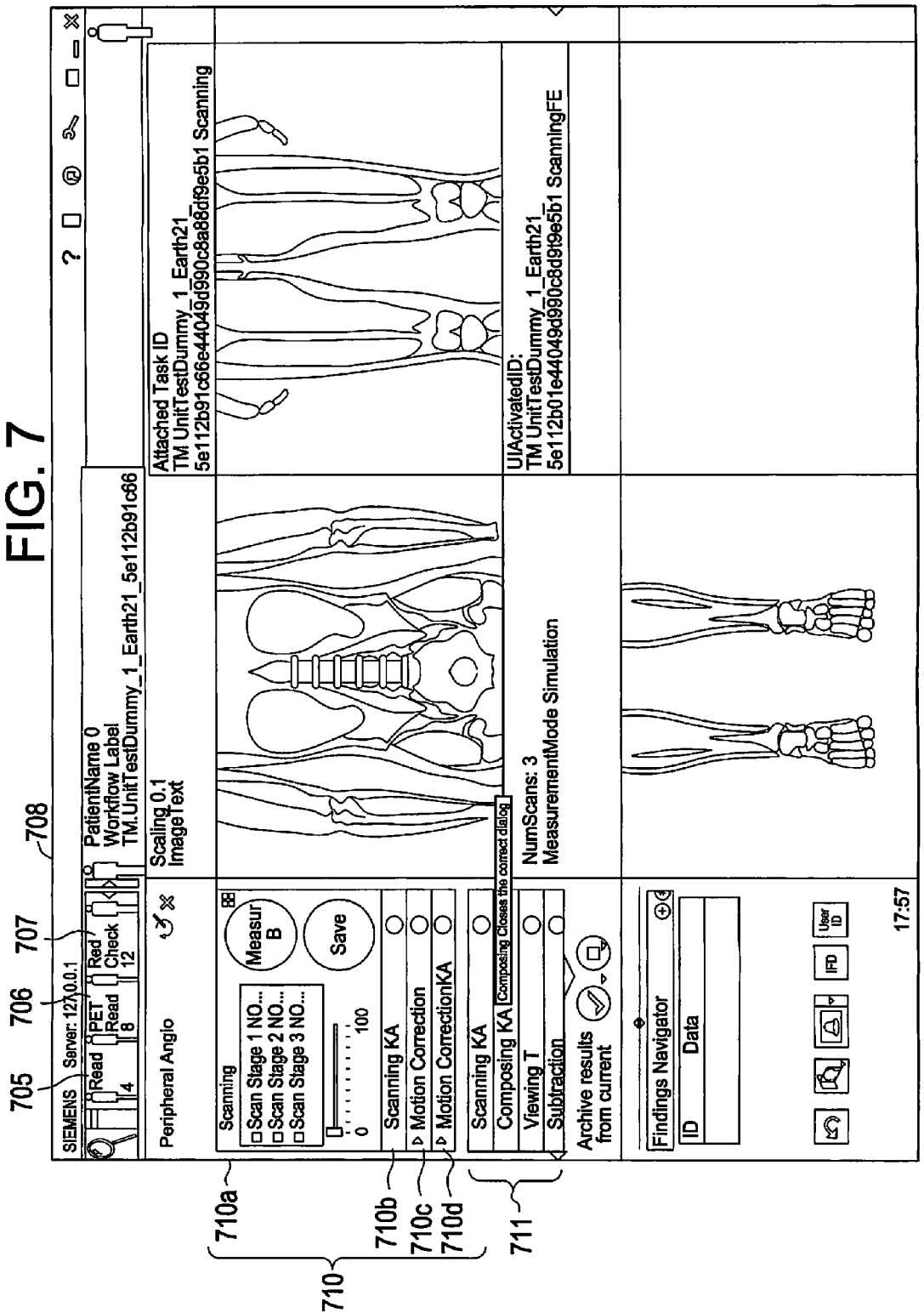
FIG. 7 illustrates a user interface according to at least one example embodiment.

FIG. 7 illustrates a user interface according to an example embodiment.

As shown in FIG. 7, a user may select from a plurality of taskflows 705-708. The user may switch between the plurality of taskflows 705-708. In FIG. 7, the taskflow 708 is the selected taskflow.

The taskflow 708 includes workitems 710 and 711. The workitem includes tasks 710a-710d. In FIG. 7, the task 710 is being illustrated for the users. In FIG. 7, the task 710 includes 4 medical images.

Alternative embodiments may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

Although the above example was described with regard to a computed tomography system, example embodiments are not limited thereto. For example, the system may be another imaging system (e.g., MRI). Further, example embodiments are not limited to imaging systems. For example, example embodiments may be related to a clinical study system or other health care management system. Further, as one skilled in the art will appreciate, example embodiments may be related to any system using tasks and/or workflows and/or taskflows.

While example embodiments have been particularly shown and described, it will be understood by one of ordinary skill in the art that variations in form and detail may be made therein without departing from the spirit and scope of the claims. Example embodiments being thus described, it will be obvious that the same may be varied in many ways. Such variations are not to be regarded as a departure from the invention, and all such modifications are intended to be included within the scope of example embodiments.

We claim:

1. A method of processing a workitem including a plurality of tasks, the method comprising:
    transmitting, by a taskflow controller, requests for completion to the plurality of tasks, respectively;
    receiving processed data from a first task of the plurality of tasks in response to a respective one of the requests, the processed data being marked as intended for a second task of the plurality of tasks;
    changing, by the taskflow controller, a counter value associated with the second task, each of the plurality of tasks being associated with a respective counter value;
    transmitting a second request to the second task;
    transmitting the processed data to the second task;
    decreasing the counter value associated with the second task during one of the transmitting the second request and the transmitting the processed data; and
    determining, by the taskflow controller, a state of the workitem based on the counter values.

2. The method of claim 1, further comprising:
    receiving completion acknowledgments from the plurality of tasks, respectively, the completion acknowledgment indicating that the associated task processed the request.

3. The method of claim 2, wherein the workitem is completed if the counter values are zero.

4. The method of claim 1, further comprising:
    receiving a completion acknowledgment from the second task before transmitting the processed data to the second task, the completion acknowledgment indicating that the second task processed the request.

5. The method of claim 4, wherein the transmitting the second request includes,
    decreasing the counter value associated with the second task.

6. The method of claim 1, wherein the transmitting the processed data to the second task includes,
    decreasing the counter value associated with the second task.

7. The method of claim 1, wherein the changing includes, increasing the counter value of the second task.

8. A non-transitory computer readable medium comprising:
    a data structure, the data structure including a task flow, the task flow including a plurality of tasks, the non-transitory computer readable medium being configured to, when executed by a processor, cause the processor to
    transmit requests for completion to the plurality of tasks, respectively,
    receive processed data from a first task of the plurality of tasks in response to a respective one of the requests, the processed data being marked as intended for a second task of the plurality of tasks,
    change a counter value associated with the second task, each of the plurality of tasks being associated with a respective counter value,
    transmit a second request to the second task,
    transmit the processed data to the second task,
    decrease the counter value associated with the second task during one of the transmitting the second request and the transmitting the processed data and
    determine a state of the workitem based on the counter values.

9. The non-transitory computer readable medium of claim 8, wherein the non-transitory computer readable medium is configured to cause the processor to,
    receive completion acknowledgments from the plurality of tasks, respectively, the completion acknowledgment indicating that the associated task processed the request.

10. The non-transitory computer readable medium of claim 9, wherein the workitem is completed if the counter values are zero.

11. The non-transitory computer readable medium of claim 8, wherein the non-transitory computer readable medium is configured to cause the processor to,
    receive a completion acknowledgment from the second task before transmitting the processed data to the second task, the completion acknowledgment indicating that the second task processed the request, and
    transmit a second request to the second task.

12. The non-transitory computer readable medium of claim 11, wherein the non-transitory computer readable medium is configured to cause the processor to,
    decrease the counter value associated with the second task.

13. The non-transitory computer readable medium of claim 8, wherein the non-transitory computer readable medium is configured to cause the processor to,
    decrease the counter value associated with the second task.

14. The non-transitory computer readable medium of claim 8, wherein the non-transitory computer readable medium being is configured to cause the processor to,
    increase the counter value of the second task.

15. A work flow management system configured to implement the method of claim 1 on a processor.

16. A medical imaging device configured to implement the method of claim 1.

17. A method of processing a workitem including a plurality of tasks, the method comprising:
    transmitting, by a taskflow controller, requests for completion to the plurality of tasks, respectively;
    receiving processed data from a first task of the plurality of tasks in response to a respective one of the requests, the processed data being marked as intended for a second task of the plurality of tasks;

changing, by the taskflow controller, a counter value associated with the first task, each of the plurality of tasks being associated with a respective counter value;

receiving a completion acknowledgment from the second task before transmitting the processed data to the second task, the completion acknowledgment indicating that the second task processed the request;

transmitting the processed data to the second task; and determining, by the taskflow controller, a state of the workitem based on the counter values, the changing including decreasing the counter value associated with the first task based on the transmitting the processed data.

18. The method of claim 17, further comprising:

receiving completion acknowledgments from the plurality of tasks, respectively, the completion acknowledgment indicating that the associated task processed the request.

19. The method of claim 18, wherein the workitem is completed if the counter values are zero.

20. The method of claim 17, further comprising:

transmitting a second request to the second task.

21. A work flow management system configured to implement the method of claim 17 on the processor.

22. A non-transitory computer readable medium comprising:

a data structure, the data structure including a task flow, the task flow including a plurality of tasks, the non-transitory computer readable medium being configured to, when executed by a processor, cause the processor to transmit requests for completion to the plurality of tasks, respectively, receive processed data from a first task of the plurality of tasks in response to a respective one of the requests, the processed data being marked as intended for a second task of the plurality of tasks, change a counter value associated with the first task, each of the plurality of tasks being associated with a respective counter value, receive a completion acknowledgment from the second task before transmitting the processed data to the second task, the completion acknowledgment indicating that the second task processed the request, transmit the processed data to the second task, and determine a state of the workitem based on the counter values, the changing the counter value including decreasing the counter value associated with the first task based on the transmitting the processed data.

23. The non-transitory computer readable medium of claim 22, wherein the non-transitory computer readable medium is configured to cause the processor to, receive completion acknowledgments from the plurality of tasks, respectively, the completion acknowledgment indicating that the associated task processed the request.

24. The non-transitory computer readable medium of claim 22, wherein the non-transitory computer readable medium is configured to cause the processor to, transmit a second request to the second task.

\* \* \* \* \*